United States Patent [19]

Kattenberg et al.

[11] 3,956,522

[45] May 11, 1976

[54] MARGARINE FAT

[75] Inventors: Hans Robert Kattenberg; Laurentius Adrianus Maria Verhagen, both of Vlaardingen, Netherlands

[73] Assignee: Lever Brothers Company, New York, N.Y.

[22] Filed: Oct. 8, 1974

[21] Appl. No.: 513,196

[30] Foreign Application Priority Data

Oct. 9, 1973 United Kingdom............... 47045/73

[52] U.S. Cl................................ 426/603; 426/607
[51] Int. Cl.²......................................... A23D 3/00
[58] Field of Search .......... 426/189, 194, 339, 356, 426/362, 417, 585, 603, 606, 607

[56] References Cited
UNITED STATES PATENTS

| | | | |
|---|---|---|---|
| 3,210,197 | 10/1965 | Galenkamp..................... | 426/339 X |
| 3,682,656 | 8/1972 | Wilton et al......................... | 426/189 |

*Primary Examiner*—Raymond N. Jones
*Assistant Examiner*—R. A. Yoncoskie
*Attorney, Agent, or Firm*—James J. Farrell

[57] ABSTRACT

The invention relates to improved fat compositions and emulsified food spreads, e.g. margarines prepared therefrom, as well as to processes for their preparation.

The fat composition comprises a liquid vegetable oil of a high polyunsaturated fatty acid content on the one hand, e.g. sunflower and safflower oil, and a specific hardstock on the other hand.

The hardstock should at least contain a bottom fraction of a substantially saturated hard fat, i.e. a fraction obtained by removing the higher melting constituents of a hard fat, preferably a hard fat which prior to fractionation had been interesterified.

As compared with prior art products of a similar polyunsaturated fatty acid content, the fat compositions are harder and moreover after production they very much faster increase in hardness.

5 Claims, No Drawings

MARGARINE FAT

The invention relates to improved plastic margarines, fat compositions therefor and to processes for their preparation.

The invention especially relates to fat compositions suitable for preparing margarines having a high content of polyunsaturated fatty acids, which acids are provided by "liquid oils".

Margarines with a high content of polyunsaturated fatty acids and a relatively low content of saturated fatty acids are nutritionally advantageous. Such margarines should be easily spreadable without being oily at room temperatures and this requirement sets a limit to the liquid oil content in the margarine. As nowadays margarines are often stored at low temperatures, e.g. in a refrigerator, it is further of importance that the product has an almost constant consistency over a broad temperature range, e.g. from 5°–25°C, so that it can be used straight from the refrigerator; fat compositions for such margarines can be prepared by blending a liquid oil and a suitable hardstock.

Particularly liquid oil containing at least 40% of polyunsaturated fatty acids, especially linoleic acid, are of importance.

Hardstocks are usually prepared from substantially completely hydrogenated fats and interesterified blends of such fats. With the object of decreasing the proportion of hardstock in the fat composition it was proposed in the past to remove the lower melting triglycerides from such a hardstock by fractionation, as it was supposed that such lower melting triglycerides could dissolve in the liquid oil and consequently did not contribute to the consistency of the fat composition nor to its ultimate polyunsaturated fatty acid content.

According to the present invention, however, fat compositions are provided which comprise a liquid oil containing at least 40% of polyunsaturated fatty acid radicals and a hardstock which includes a hard fat from which the higher melting triglycerides have been removed by a fractionation treatment.

The terms "fat" and "oil" are used in this specification as synonyms. The terms "hardstock" and "hard fat" herein refer to fatty acid triglycerides of which at least the majority, preferably at least 90%, of the fatty acids are saturated. Such triglyceride mixtures are solid at ambient temperatures. The hardstock may comprise two or more different hard fats. A "margarine fat" is a fat blend which is suitable for use as the sole fat in margarine; such a margarine fat includes a hardstock and a liquid oil. The term "liquid oil" is used in this specification for glyceride mixtures that are liquid at 5°C, particularly also at 0°C. Hard fats from which the higher constituents have been removed will be indicated as "bottom fractions".

In this specification all parts, proportions and percentages are by weight; the amount of fatty acids in an oil or fat is based on the total amount of fatty acids in said oil or fat and the amount of hardstock and/or hard fat in the fat composition is based on the total weight of said fat composition, unless otherwise stated.

It has surprisingly been established that bottom fractions do contribute more to the hardness of the fat composition than their corresponding non-fractionated fats.

An even more important advantage of the fat compositions and margarines of the invention is that after production e.g. at temperatures of about 10°–20°C they increase in hardness very much faster than similar prior art products which do not contain bottom fractions. This advantage makes it possible to offer the products to the consumer shortly after production, whereas similar prior art products should normally be tempered for a few days in order to make them suitable for transport.

Particularly bottom fractions are used obtained by removing the higher melting constituents amounting to 5–50%, especially 10–30% of the weight of the hard fat, particularly a hard fat containing 90% or more saturated fatty acids.

The fractionation treatment can be effected in a manner known per se, e.g. by dry-fractionating the hard fat, which means that the hard fat to be fractionated is subjected to an appropriate temperature until fat crystals are formed, which are separated by filtration, or by wet-fractionation in the presence of either organic solvents like acetone or detergent solutions. The latter treatments of course should be effected at temperatures chosen dependent on the fat to be treated, the type and proportion of solvent or wetting agent used and the proportion of top fraction to be removed.

A suitable bottom fraction can e.g. be prepared from a hard fat which prior to fractionation had been interesterified; particularly bottom fractions are prepared from a hard fat which prior to fractionation consisted of an interesterified blend of two or more substantially completely hydrogenated fats.

Particularly preferably a bottom fraction is used of a hard fat that prior to fractionation consisted of an interesterified fat blend of:

a. a substantially completely hydrogenated lauric type fat of a melting point of 30°–40°C, i.e. hydrogenated coconut fat, hydrogenated palmkernel fat or hydrogenated babassu fat on the one hand and b. a hydrogenated fat containing at least 50%, particularly at least 80% of saturated fatty acids with 16–18 carbon atoms, e.g. hydrogenated palm fat of a melting point of 50°–65°C, hydrogenated soybean fat of a melting point of 60°–75°C, hydrogenated groundnut fat of a melting point of 55°–65°C or hydrogenated sunflower fat of a melting point of 60°–75°C on the other hand.

Particularly bottom fractions of hard fats are used in which the weight ratio of the hydrogenated lauric type fat to the hydrogenated fat containing at least 50% of saturated fatty acids with 16–18 carbon atoms is (5–75) : (95–25), especially (10–55) : (90–45).

Although the hardstock of the fat composition of the invention can consist of one or more bottom fractions, it is even more advantageous to use hardstocks that further include a second hard fat of a slip melting point higher than that of the bottom fraction, particularly higher than that of the top fraction removed in preparing the bottom fraction.

A suitable second hard fat in the hardstock of the fat composition of the invention is a hydrogenated fat containing at least 50% of fatty acids with 16–18 carbon atoms, particularly a fat containing at least 80% of fatty acids with 16–18 carbon atoms.

Examples of suitable second fats are hydrogenated palm fat of a melting point of 50°–65°C, hydrogenated soybean fat of a melting point of 60°–75°C, hydrogenated groundnut fat of a melting point of 55°–65°C or hydrogenated sunflower fat of a melting point of 60°–75°C.

It is a great advantage of the fat composition of the present invention that it can contain less hardstock than was hitherto regarded to be possible for fat compositions of similar hardness values. The hardness of the fat compositions, as described in this specification, are determined by the method of A. J. Haighton as described in "J.A.O.C.S.", 36 (1959), pp. 345–348.

A suitable fat composition to be used as a margarine fat should have a hardness value at 10°C of at least 100 and at 20°C of at least 65.

The fat composition of the present invention preferably comprises 6–12% by weight of hardstock particularly 7–11%. In the hardstock 0–35%, particularly 10–25% can consist of the second hard fat, leaving 100 to 65%, particularly 90–75% for the bottom fraction, calculated on the weight of the total hardstock. The remainder of the fat composition preferably consists of liquid oil, e.g. sunflower, wheat germ, soybean, grapeseed, poppyseed, tobaccoseed, rye, walnut, corn or sesame oil.

The invention also provides a process for preparing a fat composition suitable for margarine preparation which comprises:

i. removing by fractionation 5–50% of the higher melting constituents from a hard fat to prepare a bottom fraction;

ii. blending 65–10% of said hard fat bottom fraction with 0–35% of a second hard fat of a melting point higher than that of the bottom fraction to prepare a hardstock;

iii. blending 6–12% of the hardstock with 94–88% of a liquid oil containing at least 40% of polyunsaturated fatty acid radicals.

In making margarine, or other edible plastic fat-in-water emulsions, the edible fat composition can be emulsified in a conventional way with an aqueous phase, at a temperature at which the fat composition is liquid. The emulsion is then subjected to rapid chilling; in a conventional surface-scraped heat exchanger, e.g. a Votator apparatus, as described in "Margarine" by Andersen and Williams, Pergamon Press (1965), page 246 et seq. Usually the liquid emulsion is e.g. chilled from a temperature of 35° to 45°C with a Votator-A unit to a temperature of 5°–25°C and after passing a resting tube, e.g. a Votator-B unit, the margarine is wrapped. When the margarine in liquid form is filled into tubs the liquid emulsion is passed through one or more surface-scraped heat exchangers and directly filled into these tubs.

The aqueous phase can contain additives which are customary for margarine, for example emulsifying agents, salt and flavours. Oil-soluble additives e.g. flavouring compounds, vitamine etc. can be included in the fatty phase. Generally the proportion of fatty phase in a margarine varies from about 75 to 80% of the emulsion depending on local statutory requirements for margarine. Alternatively higher proportions of the aqueous phase can be adopted in the production of so-called low-fat spreads, which can contain as little as 35, 40 or 50 up to 60% by weight of fat.

It is a great advantage of the present invention, that margarine fats can be prepared containing a small amount of the hard fat component and consequently a large quantity of liquid oil from which margarine can be made of sufficient hardness for tub-filling or even for wrapping in a parchment wrapper.

The invention will now be illustrated by the following examples in which all parts, proportions and percentages are by weight.

EXAMPLES I–XII

Hardstocks were prepared from the following raw materials:

| (1) | hydrogenated lauric fats: |
|---|---|
| (1.1) | hydrogenated palmkernel fat m.p. 39°C |
| (1.2) | hydrogenated coconut fat m.p. 34°C |
| (2) | hydrogenated $C_{16-18}$ fats: |
| (2.1) | hydrogenated palm fat m.p. 58°C |
| (2.2) | wet-fractionated palm fat (top fraction) m.p. 58°C |
| (2.3) | hydrogenated soybean fat m.p. 69°C |
| (2.4) | hydrogenated groundnut fat m.p. 60°C |

The hardstocks were prepared by blending one or more fats of class (1) with one or more fats of class (2), interesterification of the blend obtained, removing the top fraction of the interesterified blend to obtain a bottom fraction and sometimes by blending the bottom fraction with one or more fats of class (2).

The interesterification was carried out as follows.

The mixture of fats was dried to a water content below 0.03% by weight and subsequently interesterified at a temperature within the range of 110°–140°C in a stirred vessel which was kept under a vacuum of e.g. 2 mm mercury, 0.01 to 0.3% or 0.5% by weight of sodium ethoxide was added as a catalyst. After about 20 minutes the vacuum was released. The catalyst was destroyed by washing the interesterified mixture with water and afterwards the mixture was dried as before.

The fractionation was carried out as follows.

a. acetone-fractionation

The fat to be fractionated was dissolved in acetone (fat/acetone weight ration 1:5). The solution was poured into a funnel with cooling mantle and stirring device and slowly cooled to the fractionation temperature. The mixture was kept at this temperature for 2 h and subsequently filtered over a Büchner filter. The residue was washed twice with acetone, after which from both fractions the acetone was distilled off. For fractionation at high temperatures, the addition of crystal nuclei was necessary.

b. Dry fractionation

The fat was heated to 80°C, poured into a vessel with cooling mantle and stirring device, and subsequently slowly cooled to the fractionation temperature. Then some solid fat was added to start the crystallization, which was continued for 4 h, after which it was filtered over a Büchner filter.

The fat compositions were prepared by blending a hardstock with a liquid oil containing at least 40% of polyunsaturated fatty acid radicals.

The results are compiled in the attached table.

HARDSTOCK

| Example No. | Interesterified hard fat | | | | | | bottom fraction | |
|---|---|---|---|---|---|---|---|---|
| | Type lauric fat | m.p. °C | wt.% calculated on int. fat | Type $C_{16-18}$ fat | m.p. °C | wt.% calculated on int. fat | wt.% calculated on interest. fat | wt.% calculated on hardstock |
| 1 | palm kernel | 39 | 20 | soybean | 69 | 40 | 80** | 100 |
| | | | | palm fraction* (85% of lower melting constituents removed) | 58 | 40 | (20% top removed) | |
| Control | ibid | ibid | ibid | ibid | ibid | ibid | 100 (thus not fractionated) | ibid |
| 2 | ibid | ibid | ibid | ibid | ibid | ibid | 75*** (25% top removed) | ibid |
| 3 | coconut | 34 | ibid | ibid | ibid | ibid | 85** (15% top removed) | ibid |
| 4 | palm kernel | 39 | ibid | ibid | ibid | ibid | 60*** (40% top removed) | 100 |
| 5 | ibid | ibid | ibid | ibid | ibid | ibid | ibid | ibid |
| 6 | ibid | ibid | ibid | ibid | ibid | ibid | ibid | ibid |
| 7 | ibid | ibid | ibid | palm fraction* (85% of lower melting constituents removed) | 58 | 80 | 80** (20% top removed) | 80 |

HARDSTOCK

| Example No. | Second hard fat | | | Hardstock | Liquid oil | | Fat composition | | |
|---|---|---|---|---|---|---|---|---|---|
| | Type | m.p. °C | wt.% calculated on hardstock | wt.% calculated on fat compos. | Type | wt.% calculated on fat compos. | at 10°C | at 15°C | at 20°C |
| 1 | — | — | — | 8 | sunflower | 92 | 160 | 140 | 70 |
| Control | — | — | — | ibid | ibid | ibid | 140 | 120 | 70 |
| 2 | — | — | — | ibid | ibid | ibid | 190 | 150 | 80 |
| 3 | — | — | — | ibid | ibid | ibid | 160 | 130 | 70 |
| 4 | — | — | — | 6 | ibid | 94 | 80 | 65 | 40 |
| 5 | — | — | — | 10 | ibid | 90 | 180 | 120 | 70 |
| 6 | — | — | — | 12 | ibid | 88 | 190 | 160 | 95 |
| 7 | soybean | 69 | 20 | 8 | ibid | 92 | 160 | 130 | 70 |

HARDSTOCK

| Example No. | Interesterified hard fat | | | | | | bottom fraction | |
|---|---|---|---|---|---|---|---|---|
| | Type lauric fat | m.p. °C | wt.% calculated on int. fat | Type $C_{16-18}$ fat | m.p. °C | wt.% calculated on int. fat | wt.% calculated on interest. fat | wt.% calculated on hardstock |
| Control | ibid | ibid | ibid | ibid | ibid | ibid | 100 (thus not fractionated) | ibid |
| 8 | ibid | ibid | 40 | palm | 58 | 60 | 62 (removed 10% top** and 28% bottom****) | 100 |
| 9 | ibid | ibid | 20 | ibid | ibid | 80 | 80 (removed 20% top)** | 100 |
| 10 | ibid | ibid | 50 | ibid | ibid | 50 | 86 (removed 14% top)** | 66.5 |
| Control | ibid | ibid | ibid | ibid | ibid | ibid | 100 (thus not fractionated) | ibid |
| 11 | ibid | ibid | ibid | ibid | ibid | ibid | 86 (removed 14% top)** | 75 |
| 12 | ibid | ibid | ibid | ibid | ibid | ibid | 86 (removed 14% top)** | 66.5 |

HARDSTOCK

| Example No. | Second hard fat | | | Hardstock | Liquid oil | | Fat composition Hardness values | | |
|---|---|---|---|---|---|---|---|---|---|
| | Type | m.p. °C | wt.% calculated on hardstock | wt.% calculated on fat compos. | Type | wt.% calculated on fat compos. | at 10°C | at 15°C | at 20°C |
| Control | ibid | ibid | ibid | ibid | ibid | ibid | 150 | 120 | 70 |
| 8 | — | — | — | 8 | safflower | 92 | 120 | 100 | 90 |
| 9 | — | — | — | 10 | wheat germ | 90 | 160 | 150 | 90 |
| 10 | palm | 58 | 33.5 | 8 | corn | 92 | 155 | 125 | 80 |
| Control | ibid | ibid | ibid | ibid | ibid | ibid | 105 | 85 | 75 |
| 11 | groundnut | 60 | 25 | ibid | sunflower safflower | 46 46 | 110 | 105 | 85 |
| 12 | palm fraction* (85% of | 58 | 33.5 | 8 | ibid | ibid | 115 | 95 | 85 |

| | HARDSTOCK | | | | | | | |
|---|---|---|---|---|---|---|---|---|
| | Interesterified hard fat | | | | | bottom fraction | | |
| Example No. | Type | m.p. °C | wt.% calculated on hardstock | wt.% calculated on fat compos. | Type | wt.% calculated on fat compos. | at 10°C | at 15°C | at 20°C |
| | lower melt. constituents removed | | | | | | | | |

*obtained by acetone fractionation of unhydrogenated palm oil at 20°C, and subsequently hydrogenating the stearine fraction
**obtained by acetone fractionation at 40°C, except in Examples 10, 11 and 12 at 34°C
***obtained by dry fractionation at 50°C
****obtained by acetone fractionation at 10°C

EXAMPLE XIII

A hardstock was prepared from an interesterified fully hydrogenated blend of
- 40 parts of hydrogenated soyabean oil (melting point 69°)
- 40 parts of hydrogenated palm fraction (85% of lower melting constituents removed; melting point 58°C).
- 20 parts of hydrogenated palm kernel oil (melting point 39°C).

The hardstock was blended with sunflower oil (weight ratio 1:2) and dry-fractionated at 44.5°C. The olein, 911 grams, was recovered and the stearins, 236 grams, removed. The olein fraction obtained was diluted with sunflower oil to obtain a fat composition containing 90% sunflower oil and 10% bottom fraction. A margarine was prepared from 80% of the fat composition (including 0.1% monoglycerides of fully hydrogenated palm oil) and 20% of an aqueous phase, containing one-third of milk and two-thirds of water, using a conventional Votator arrangement consisting of two cooling cylinders and one crystallizer. The hardness values of the resulting margarine were:
- 174 at 5°C
- 125 at 10°C
- 115 at 15°C and
- 81 at 20°C

EXAMPLE XIV

Margarines were prepared from the fat compositions of Examples I–XII as follows.

The margarine fat blend was melted and emulsified with an aqueous phase prepared from soured milk containing 0.1% monodiglycerides to give an emulsion containing 80% of fat.

The emulsion was crystallized and worked in a closed tubular surface-scraped heat exchanger (Votator A-Unit), which was left at a temperature of 15°C. The cooling temperatures in the A-Unit were from −6°C to 10°C and 40% of the treatment emulsion was recirculated. Thereafter the crystallized emulsion was passed through a resting tube (Votator B-Unit), where it crystallized further for 160 sec. and was then liquid-filled into tubs. The hardness values and the dilatation values of the products obtained hardly differed from those mentioned in the previous examples.

What is claimed is:

1. Margarine fat consisting essentially of a liquid oil containing at least 40% of polyunsaturated fatty acid radicals and 6–12% of a hard stock consisting essentially of:
   i. 65–100% of a hard fat bottom fraction obtained by removing 5–50% of the higher melting constituents of a hard fat that prior to fractionation consisted of an interestified blend of two or more substantially completely hydrogenated fats, at least one being a hydrogenated lauric type fat of a melting point of 30°–40°C and at least one being a hydrogenated fat containing at least 50% of saturated fatty acids with 16–18 carbon atoms, the weight ratio of the hydrogenated lauric type fat to the hydrogenated fat containing at least 50% of fatty acids with 16–18 carbon atoms being (5–75):(95–25);
   ii. 0–35% of a second hard fat of a melting point higher than that of the bottom fraction, said hard fat containing at least 50% of fatty acids with 16–18 carbon atoms.

2. Margarine fat according to claim 1, in which one of the substantially hydrogenated fats is selected from the group consisting of hydrogenated palm fat of a melting point of 50°–65°C, hydrogenated soybean fat of a melting point of 60°–75°C, hydrogenated groundnut fat of a melting point of 55°–65°C and hydrogenated sunflower fat of a melting point of 60°–75°C.

3. Margarine fat according to claim 1 containing 7–11% by weight of hardstock.

4. Margarine containing as margarine fat the fat composition of claim 1.

5. Process for preparing a margarine fat suitable for margarine preparation which comprises
   i. preparing a bottom fraction by removing by fractionation 5–50% of the higher melting constituents of a hard fat that prior to fractionation consisted of an interesterified blend of two or more substantially completely hydrogenated fats, at least one being a hydrogenated lauric type fat of a melting point of 30°–40°C and at least one being a hydrogenated fat containing at least 50% of saturated fatty acids with 16–18 carbon atoms, the weight ratio of the hydrogenated lauric type fat to the hydrogenated fat containing at least 50% of fatty acids with 16–18 carbon atoms being (5–75):(95–25);
   ii. preparing a hard stock by blending 65–100% of said bottom fraction with 0–35% of a second hard fat of a melting point higher than that of the bottom fraction, said hard fat containing at least 50% of fatty acids with 16–18 carbon atoms;
   iii. preparing the margarine fat by blending 6–12% of said hard stock with 94–88% of a liquid oil containing at least 40% of polyunsaturated fatty acid radicals.

* * * * *